March 12, 1968 W. J. MILLS II Re. 26,363

FABRIC COVER FOR BOATS

Original Filed Oct. 8, 1962 2 Sheets-Sheet 1

INVENTOR

WILLIAM J. MILLS II

BY Walter W. Burns

ATTORNEY

March 12, 1968 W. J. MILLS II Re. 26,363

FABRIC COVER FOR BOATS

Original Filed Oct. 8, 1962 2 Sheets-Sheet

INVENTOR

WILLIAM J. MILLS II

BY Walter W. Burns

ATTORNEY

United States Patent Office

Re. 26,363
Reissued Mar. 12, 1968

26,363
FABRIC COVER FOR BOATS

William J. Mills II, 125 Main St.,
Greenport, N.Y. 11944

Original No. 3,192,542, dated July 6, 1965, Ser. No. 228,982, Oct. 8, 1962. Application for reissue Jan. 13, 1967, Ser. No. 612,754
14 Claims. (Cl. 9—1)

Matter enclosed in heavy brackets [ ] appears in the original patent but forms no part of this reissue specification; matter printed in italics indicates the additions made by reissue.

*ABSTRACT OF THE DISCLOSURE*

*A cover construction with securing means therefor is provided to effectively cover the opening in a lifeboat, tender or other small boat, when the boat is not in actual use, wherein a series of resilient fastener-clips, attached to the cover, serve to hold the cover in place on the boat. It is a feature of this construction that the cover can be quickly applied or removed, as required, and that the fastener-clips on the cover require no engaging hardware or fixtures on the boat, and that the fastener-clips will not mar or damage the finish of the boat surface.*

This invention relates to covers for boats and particularly covers for boats on which, on occasion, it might be desirable to release the cover from the boat without unnecessary delay. *This invention also relates to the clips or fasteners for retaining the boat covers in place, while also permitting their easy removal.*

The primary object of this invention is the provision of an improved cover for a boat which may be a tender or life boat for a larger boat.

Another object of the invention is the provision of an improved cover for a boat which is secured to the gunwale guard of the boat in such a manner that it can be removed from the gunwale guard of the boat without resorting to any other agency [that] *than that which* is a part of the fastener of the cover.

Still another object of the invention is the provision of a boat cover which is readily attachable or detachable by means forming a part of the cover and independently of any part of the boat itself.

A still further object of the invention is the provision of a boat cover having means forming a part of itself for securing the cover to the gunwale guard of a boat as usually constructed.

Still another object of the invention is the provision of a cover for a boat *having a clip or fastener means* which avoids the use of eye-bolts, screw-eye bolts or any other objectional fittings which are usually used for securing means and which are in the way to catch on clothing and also weaken the structure of the boat, as well as spoil the looks of the craft.

Still another object of the invention is the provision of an improved boat cover wherein are provided fasteners which are so constructed that when secured to the gunwale guard of a boat, any tension in the cover will be met with considerable resistance, yet when it is desired to remove the cover, a slight pressure on a portion of the respective fasteners will readily release the fasteners for removal of the cover.

Another object of the invention is the provision of a fastener means which is attached to the body of the boat cover, which fastener means provides the sole securing means for attachment to the boat.

Still another object of the invention is the provision of a cover for boats wherein there is a series of fastener means *or clips* which are so constructed that they may grip the gunwale guard at any point along the length where applied and may to some extent be moved along the gunwale guard to adjust themselves to the gunwale guard to secure the cover at any place where the cover is applied.

Another and further object of the invention is the provision of a boat cover having fastener means which have also a holding means for retaining a draw-cord which may be locked in position to make sure no tampering with the cover may take place without its being apparent from a casual inspection.

Still another and further object of the invention is the provision of a combination of a boat and flexible cover therefor wherein the cover is provided with a fastener means to resiliently hold the cover in place with a cooperating draw-cord incorporated in the structure for drawing the cover edge close to the boat throughout the length of the edge of the cover.

Another object of the invention is the provision of a cover for boats which will be provided with substantially equally spaced fastening means having gripping means for holding the cover in place and a handle portion for ready release when it is desired to remove the cover from the boat.

Another object of the invention is the provision of a combination of a boat and cover therefor wherein the construction requires no hardware of any kind secured to the surface of or fastened into the body *or hull* structure of the boat itself.

Other and further objects of the invention will be apparent from a reading of the complete specification and claims.

The problem as it presents itself is one that has always existed in the use of boats. It is necessary to provide some covering for the boats to maintain the interior of the boats in a clean condition and in some instances to discourage the unauthorized use of the interiors or equipment. At the same time, it is necessary to keep them in such condition that they may be readily used with their equipment, without unnecessary delay, as when the boats may be needed as life boats. The conventional boat which is kept covered when not in use, is provided with fittings such as snaps, eye-bolts or small hooks along the upper edge of the gunwale as beneath the gunwale guard and the cover is provided with registering snaps or with grommets through which a line passes and engages the hooks or eyes or other fittings. This line can then be drawn tight and tied to hold the cover in proper relation to the boat.

There are many objections to this construction. Too much time is consumed in applying the cover and removing it when necessary to use the boat. The application of the eye bolts or hooks or other fittings necessarily weakens the construction of the boat and the presence of the eye-bolts or screws means a line of obstructions which may easily be caught on clothing, to the annoyance of the boat users.

Obstructions on the hull of the boat are an annoyance when painting has to be done or when a new cover has to be provided for the boat. Where any of the usual fasteners are used on the boat, complementary fasteners have to be very accurately placed on the cover, and even when so placed do not always register when the cover *is made of canvas, as changes in shape and size occur due to* [if made, of canvas, changes in shape and size due to] weather conditions, and this causes registration difficulties. All of this indicates the necessity of a cover having fastening means which will not be affected by weather, will be readily secured to the gunwale guard of a boat[,] without any adjustment, and yet will be the sole means to secure the boat cover in its proper position, and look well.

On the drawing wherein I have illustrated embodiments of the invention,

Figure 12:
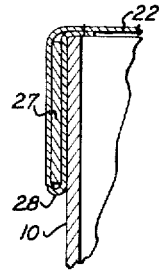
Figure 11:
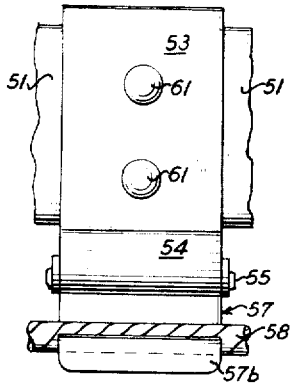
FIG. 11 is a view of FIG. 10 taken at 90° from FIG. 10 with the cover body removed.

FIG. 12 is a detail view of a cross-section of the batten 27 enclosed in a fold 28 of the boat cover body 22 at the after end of the cover.

Figure 13:
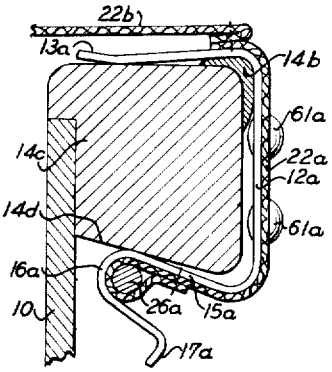

FIG. 13 is a view of the side of another form of the invention showing a fold pocket to hold the draw-cord.

Figure 15:
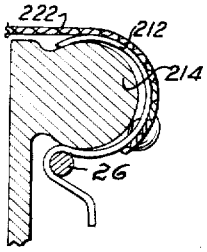
Figure 16:
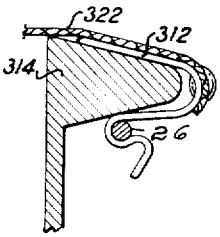
Figure 14:
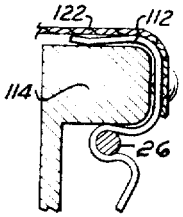

FIGS. 14, 15, 16 are detail views of three variations in the form of gunwale guard of the boat.

Figure 1:
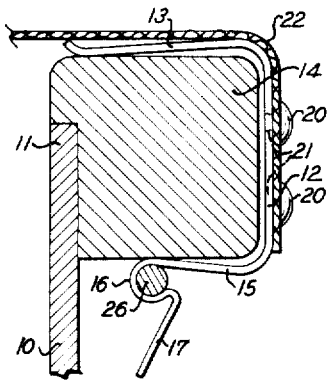
FIG. 1 is a detail of one form of fastener which shows the fastener attached to a gunwale guard of a boat.
Figure 2:
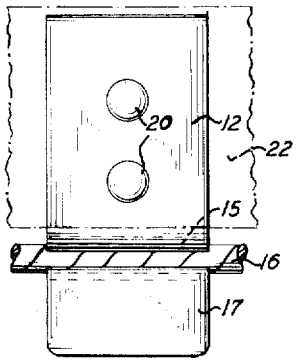
FIG. 2 is a side elevation of the fastener, with the cover body portion indicated in dotted lines.

Referring particularly to FIG. 1, the numeral 10 designates the body *or hull* of the boat having a top portion 11 or gunwale to which is rigidly connected the gunwale guard 14 which provides a stiffening means for the upper edge 11 of the gunwale and acts as a strengthening means for the boat as a whole. *The gunwale and gunwale-guard together form an assembly.* At this point it is made clear that neither the body of the boat nor the gunwale guard *assembly* is provided with any snap, eye-bolt, screw-hook or any other fitting for the purpose of later fastening or securing the cover member in place.

As a sole means for securing the cover member to the boat, there is provided a fastener which is secured to the cover and though its own resiliency or construction provides the only securing means for attaching the cover to the gunwale guard.

The generally vertical body portion of this fastener, I have designated by the numeral 12 and at the top end of the vertical member 12, there is provided a generally right angular portion 13 which extends in an inboard direction and may engage the top of the gunwale guard 14.

As shown in FIG. 1, the generally vertical portion 12 of the fastener means lies generally against the outer side of the gunwale guard 14 and has at its lower edge, an inwardly extending member 15 which is designed to extend under *and press upwardly on* the gunwale guard 14 and at its inner end is provided with a loop 16 which contacts the underside of the gunwale guard 14. The gunwale 11 and the gunwale guard *14* will sometimes be referred to as the gunwale assembly. This loop or turned in portion 16 at the inner end of the inwardly extending member 15, has a handle member 17, at its end. This whole structure comprising the parts 12, 13, 15, 16 and 17 are in this form of the invention, resilient, and constitute a fastener which may be sprung over the gunwale guard of a boat. Secured to the outer portion 12 of the fastener means by fastening means 20 in appropriate openings 21 is the body member 22 of a flexible cover which protects the opening of the boat.

The body portion 22 of the cover member covers the opening of the boat and extends over the outer edge of the gunwale guard 14 and over the outside of the portion 12 of the fastener which is attached to the underside of the body member 22.

The *clips or* fasteners are spaced around the periphery of the body 22 of the cover member in sufficient number to hold the cover in proper relation to the boat to prevent wind from dislodging the cover and discourage unlawful tampering by unauthorized persons.

The action of the fastening means in holding the body portion of the cover member, depends upon the resultant of the many forces acting upon the fastening member. The resilience in the portion 12 together with the resilience of the top portion 13 and the inwardly extending member 15 tend to have a gripping action on the gunwale guard 14, and all counteract the action of the flexible body member 22 of the cover as it normally tends to lift on the member 12 through the action on the rivets 20. In order to clear the fastening member from the gunwale guard it is necessary only to increase the distance between the extremity of the inner end of the member 13 and the contact portion of the loop 16 of the fastener to permit the latter to bend and clear the outer lower edge of the gunwale guard 14. When it is desired to remove the cover from the boat, the hand piece 17 of each fastener member is successively grasped and moved in an outboard direction until the loop 16 of the fastener means clears the lower outer edge of the gunwale guard 14. When all fastener means have been released, the cover may be folded or stored where it will not be in the way of other operations.

Figure 6:
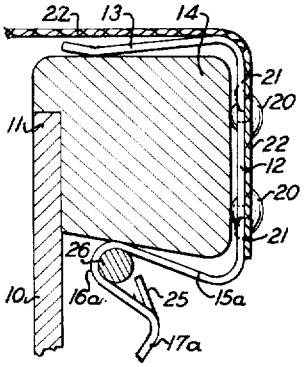
FIG. 6 is a side view of FIG. 5.
Figure 3:
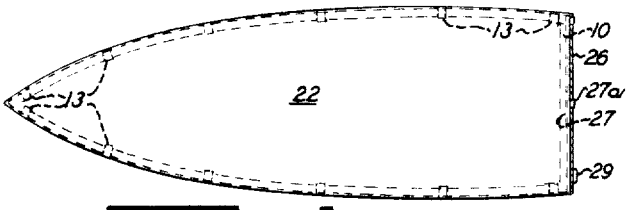
FIG. 3 is a top plan view of the boat cover showing the fasteners distributed along the edge of and beneath the body of the cover, for attachment to the gunwale guard of the boat.
Figure 5:
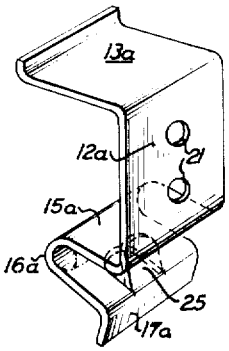
FIG. 5 is a perspective view of a slightly different form of fastener.

On FIGS 5 and 6, I have illustrated a slight modification wherein there is provided on each fastener means a space for a locking cord to discourage unlawful entry or unlawful removal of the cover without leaving information of such entry which will be very apparent to the custodian that the unlawful entry has been undertaken.

This construction in the modification herein illustrated, provides a tongue 25 which is struck-up from the handle portion 17[a] of the fastener means. The space between the struck-up portion 25 and the inwardly extending member 15[a] is provided just great enough to tightly receive a cord 26 which may be forced into place, where its resiliency will hold it from ordinary displacement. By using nylon cord or a cord of some other material which does not absorb moisture readily, it is possible to have a holding means for the fasteners which will retain its length with varying weather conditions.

The draw-cord 26 will be held in place by the several tongues 25 of the handle members 17[a] in a manner well understood. It will be observed that the draw-cord 26 has sufficient play to permit it to be used as a tightener cord so that when the cover member is in place, with the fastener members in operative position, the draw-cord 26 can be pulled up at the ends and so long as the draw-cord is held tightly, the fasteners will be held in operative position and the cover member will be held in place. The means for securing the draw-cord so that it will remain tight will be later described.

Figure 4:
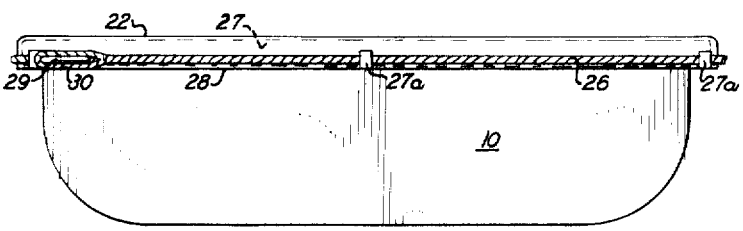
FIG. 4 is a stern view of a boat with the cover in place.
Figure 7:
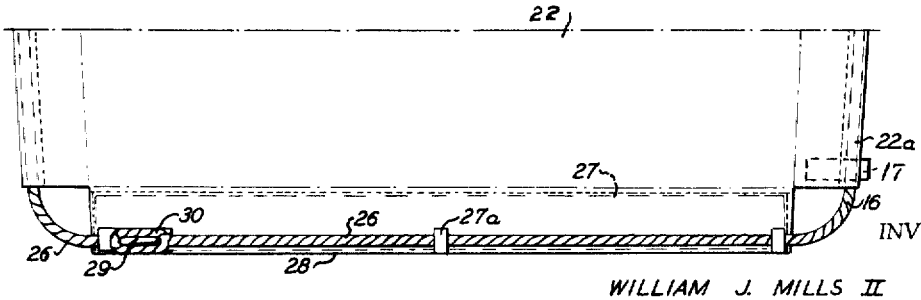
FIG. 7 is a partial detail view of a pattern of the stern portion of the boat cover showing the turned down rear edge and the stern batten of the cover.

FIG. 4, which illustrates the stern of a boat to which my invention has been applied, shows the fold 28 of the cover member 22 which contains batten 27 to take the place of fastener means when the cover member is used on this type of craft. Gunwale guards are not usually used across the stern of square-stern craft. The batten 27 is enclosed in a fold 28 which is integral with the body member 22 of the cover and at its rear extremity. This fold 28 is attached at the edge of the body member 22 at its after edge and its ends are closed but on a line with the edges of the cover body member 22, so that the draw-cord 26 may pass between the end-edges of the body of the cover member and the fold 28. In this way, the cord may be tightened on the outside of the fold 28 and attached at one end to the batten 27 and the free end to the hasp loop 29 which I show located at one end of the batten 27. Suitable keepers 27[a] are used on the batten 27 to permit the cord 26 to slide. The draw-cord is drawn through the fastener members until it is tight. At the free end of the draw-cord are loops 30 formed of the cord. After the cord has been drawn tight, the cord loop is slipped over the hasp loop 29. This cord loop may now be secured by either a peg or a padlock 31 in a well known manner.

I will now describe another slightly different form of my invention wherein a pivoted member is provided to assist the resilience of the fastener member in its gripping action on the gunwale guard to hold the body member 22 of the cover in place on the boat.

Figure 10:
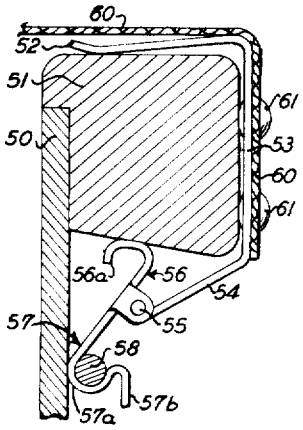
FIG. 10 is an elevational cross-section of another form of the invention.
Figure 8:
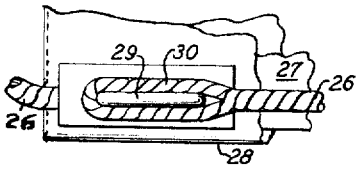
FIG. 8 is a detail elevation of the hasp loop of the draw-cord locking device.
Figure 9:
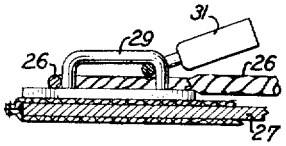
FIG. 9 is a plan view of the hasp loop with a lock in place.

A gunwale 50, *shown in FIG. 10*, is provided with a gunwale guard 51 attached to the upper edge of the gunwale 50 as in the forms of the invention already described. An upper gripping member 52 is provided on top of the fastener member to rest on the top of the gunwale guard 51 and has at its outer edge an integral upright portion 53 which in turn has an inturned portion 54 which extends under the outer edge of the gunwale guard 51 to hold a pivot member 55. This pivot member 55 has pivoted thereon a locking member 56 which impinges on the underside of the gunwale guard 51 when the parts are in operative position.

Integral with and movable with the locking member 56 is a lever 57 which controls the movement of the locking member 56 until its upper rearwardly extending *Cam* portion 56[a] engages the underside of the gunwale guard 51. At this point, the movement is stopped and the fastener member as a whole is held in engagement with the underside of the gunwale guard 51 and there held against turning by the extending portion 56[a].

Integral with the lower end of the locking member 56 is a lever handle member 57 which when in locked position, is adjacent the wall of the gunwale as at 57[a]. At this point 57[a], there is a loop with a handle member 57[b] integral therewith. This handle member 57[b] operates to control the movement of the locking member 56 and is provided with a cord-surrounding curved portion at 57[a] which serves the purpose of providing a holder for a *draw*-[pull-]cord 58, for the same purpose as the *draw*-[pull] cord 26 already described for another form of the invention. The loop at the point 57[a] is of sufficient size to hold the *draw*-[pull-]cord 58 in position under all normal conditions but it may be removed when it is desired to do so.

Suitably secured to the upright portion 53 is the body member 60 of the cover member, by the rivets 61 in suitable holes of the upright member 53 of the fastener members.

In operation, the fastener members are placed over the gunwale guard 51 with the inwardly extending member 54 beneath the gunwale guard 51. When in place, the lever handle member 57[b] is pulled downward and inward to lock the lever member 56 in place as described. When the *draw*-[pull-]cord 58 is drawn up tight, it will slide in the loop portions at 57[a] and may be held taut in any suitable manner, as by a hasp and loop construction as already described for another form.

The body member 60 of the cover is held in place on the cover by the rivets 61 as in the other modification.

The body *or hull* of the boat may be of fiber glass, wood, steel, one of the lighter materials such as alloys of aluminum or magnesium, one of the plastics or of any suitable material. But in using any one of these materials many advantages are gained by having the body, gunwale and gunwale guard free of fastener fittings and having the cover secured to the gunwale guard at any place along the gunwale guard.

In FIG. 13, I have illustrated a slightly different form of the invention wherein the draw-cord 26 may be installed loosely within an outer fold 22[a] of the body portion 22 of the boat cover. In this form, there is a fold 22[a] provided which encloses the draw-cord 26[a] loosely and permits the draw-cord to slide easily to take up the slack. It has been found that by making a separate piece 22[a] for the fold and stitching it to the main body of the cover 22[b], as at 22[c] a more finished and better appearing job may be produced. An advantage in using this form of draw-cord and fold is that the cord is kept covered and therefore protected. Moreover this form is more easily operated and presents a neater appearance and a more nearly wind and water tight construction since the fold or lapel 22[a] shown in FIG. 13 is attached to the main body 22[b] of the cover so that its surface may be substantially vertical to fit the substantially upright wall of the outside surface of the gunwale guard, combing or other surface which it is designed to fit. The looseness of the draw-cord renders it easily tightened or loosened throughout the periphery when *putting* [puting] the cover in place or removing it.

In FIG. 13, I illustrated a gunwale of a slightly different type. A wear-rail *14*[b] [14[d]] of metal may be provided on the upper outer edge of the guard.

The gunwale guard 14[c] is provided with a more pronounced undercut at 14[d] than is shown in some of the other forms which illustrates how one type of fastener may serve several forms of gunwale guards. By using an "average" fastener, the same type of fastener may be used for several types of gunwale guards, the fastener being "sprung" if necessary to make it fit.

In FIG. 13, the stitching is shown partially separated for the purpose of clear illustration. In this form the rivets 61[a] are secured through the fold 22[a] to the upright portion of the fastener member portion 12[a].

In FIGS. 14 to 16, I have illustrated some variations in construction of the fastener illustrated in FIG. 1, all of which operate on the same principles as the fastener of FIG. 1.

FIG. 14 shows a cover 122 held by a fastener 112, on gunwale guard 114 having a substantially rectangular cross section.

FIG. 15 shows a cover 222 held by a fastener 212 to a gunwale guard 214 which has a substantially circular cross section.

FIG. 16 illustrates a gunwale guard 314 of tapered cross section to which is held a cover member 322 by a fastener 312.

In each construction the fasteners which are attached to the edge of the body of the boat cover, are held on the gunwale guard or *cockpit* [cokpit] combing or other outside weather edge of a boat or boat opening without the use of fittings protruding from the side of the boat. It will be noted that in each instance there is a tendency of the cover to pull the fastener into an even closer clamping action on the side of the boat.

While I have shown and described embodiments of the invention, it is to be understood that various modifications and changes may be made without departing from the spirit of the invention and within its scope as claimed.

Having described my invention, what I claim is:

1. A construction which is designed to effectively cover the opening of a boat, when not in actual use, to furnish protection from rain, dust and dirt, to preserve the paint or interior finish and to provide a measure of protection for items of equipment which it may be necessary or desirable to keep with the boat at all times, said construction comprising in combination:

(a) a boat having a gunwale, (b) the gunwale being provided with a gunwale guard adjacent the upper portion of the gunwale and forming a gunwale assembly.

(c) a flexible cover member of a size and shape to protect the desired area of the boat, and having a body portion, (d) the flexible cover member bending over and downwardly at and along the top of the gunwale assembly in outward contact therewith and downwardly substantially vertically against its outboard side to protect said gunwale assembly against weather, thin sheet resilient securing members of substantially the same thickness throughout directly attached to the cover at intervals on the inside of the cover and at places below the upper place of contact between the cover and gunwale assembly and adjacent the outer side of the assembly when the securing members are in place, thus making the cover weather-protective, (e) the securing members exerting a resilient grasping action on the gunwale assembly at opposite places thereon, said gunwale assembly being free of projecting surfaces which would mar the surface of the assembly, and said securing means permitting said cover to slide a limited amount along the top of said assembly, thus holding the outer portion of the cover in a substantially vertical position against the gunwale assembly substantially throughout its length.

2. A construction which is designed to effectively cover the opening of a boat, when not in actual use, to furnish protection from rain, dust and dirt, to preserve the paint or interior finish and to provide a measure of protection to items of equipment which it may be necessary or desirable to keep with the boat at all times, said construction comprising in combination:

(a) a boat having a gunwale, (b) the gunwale being provided with a gunwale guard adjacent the upper portion of the gunwale and forming a gunwale assembly, (c) a flexible cover member of a size and shape to protect the desired area of a boat and having a body portion bent over an outer edge of the gunwale assembly and adjacent to the upper outer edge thereof, a series of thin directly-attached securing members of substantially the same thickness attached to the under surface of the cover member and sufficiently thin to hold the cover in close contact with the gunwale assembly, the securing members being resiliently bent in a shape generally to conform to the gunwale assembly, the cover attachments to the securing members being outboard of the bent-over edge, the securing members being under tension continuously when in place to hold the cover taut until the securing members are placed under additional tension by separation.

3. A construction which is designed to effectively cover the opening of a boat, when not in actual use, to furnish protection from rain, dust and dirt, to preserve the paint or interior finish and to provide a measure of protection for items of equipment which may be necessary or desirable to keep with the boat at all times, said construction comprising in combination:

(a) a boat having a gunwale.

(b) the gunwale being provided with a gunwale guard adjacent the upper portion of the gunwale and forming a gunwale assembly, (c) a flexible cover member of a size and shape to protect the desired area of the boat, and having a body portion, (d) a series of thin resilient flexible fastening members of substantially the same thickness bent to have three sides in a shape similar to a portion of the surface of the gunwale assembly, and so shaped to have two opposite sides resiliently pressed toward each other and against opposite sides of the gunwale assembly, the cover member extending from inboard, outwardly, over the top of the gunwale assembly, and downwardly on the outboard side of the boat, the cover member being attached directly to the resilient securing members on the outboard side of the gunwale assembly, the contacting surfaces of the boat cover and gunwale assembly being free of surface-marring elements.

4. A construction which is designed to effectively cover the opening of a boat, when not in use, to furnish protection from rain, dust and dirt, to preserve the paint or interior finish and to provide a measure of protection for items of equipment which it may be necessary or desirable to keep with the boat at all times, said construction comprising in combination:

(a) a boat having a gunwale, (b) the gunwale being provided with a gunwale guard adjacent the upper portion of the gunwale and forming a gunwale assembly, (c) a flexible cover member of a size and shape to protect the desired area of the boat, and having a body portion.

(d) a series of flat thin strip resilient securing members of substantially the same thickness being bent in substantially U-shape, generally following the shape of the gunwale-assembly when the securing members are in place, the securing members substantially enclosing the gunwale-assembly and being spaced along and attached to the outboard edge of the cover, and having sufficient resilience to admit the gunwale-assembly at its upper edge when the ends are open for the admission of the gunwale-assembly and to permit removal of the gunwale-assembly when the cover is removed from the boat, the securing members grasping the gunwale-assembly when in position thereon, (e) the cover being bent over the gunwale-assembly when in place, and (f) said securing members having sufficient resilience so that the ends thereof can be forced over the gunwale-assembly to hold the cover in place and that the cover is removed from the assembly by also forcing said ends apart.

5. A construction which is designed to effectively cover the opening of a boat, when not in use, to furnish protection from rain, dust and dirt, to furnish protection to the paint or interior finish, and to provide a measure of protection for items of equipment which it may be necessary or desirable to keep with the boat at all times, said construction comprising in combination:

(a) a boat having a gunwale, (b) the gunwale being provided with a gunwale guard adjacent the upper portion of the gunwale, (c) a flexible cover member of a size and shape to protect the desired area of the boat, and having a body portion, (d) a series of bendingly resilient fastener members secured to the body portion of the cover member at intervals along its edge and having portions of the respective fastener members extending across the outer surface of the gunwale guard and resiliently contacting the underside of the gunwale guard, (e) said fastener members having recesses to receive a locking cord for securing the fasteners in contact with the gunwale guard, and (f) a locking cord in the recesses for holding the fasteners in place.

6. A construction which is designed to effectively cover the opening of a boat, when not in use, to furnish protection from rain, dust and dirt, to furnish protection to the paint or interior finish, and to provide a measure of protection for items of equipment which it may be necessary or desirable to keep with the boat at all times, said construction comprising in combination:

(a) a boat having a gunwale, (b) the gunwale being provided with a gunwale guard adjacent the upper portion of the gunwale, (c) a flexible cover member of a size and shape to protect the desired area of the boat, and having a body portion.

(d) a series of bendingly resilient fastener members secured to the body portion of the cover member at intervals along its edge and having portions of the respective fastener members extending across the outer surface of the gunwale guard and contacting the underside of the gunwale guard, (e) said body portion having a fold to receive a locking cord for securing the fasteners in contact with the gunwale guard, and (f) a locking cord in the fold for holding the fasteners in place while still permitting limited movement of the cover along the gunwale, longitudinally.

*7. A fastener-clip construction which is designed as an attachment for the cover of a small boat, for use when the boat is not actually being used, to provide a holding means between the cover and gunwale assembly or edge of the boat, to provide a securing means which will utilize no marring surface or other projecting means extending from the gunwale guard or any other part of the boat to the clip member, and will in itself have no projections which could in any way harm the boat surface; said fastener-clip comprising:*

*(a) a fastener-clip body member of resilient material adapted to fit the gunwale guard edge of a boat,*

*(b) the body member being formed of a flat resilient strip of material and having a smooth surface following generally a cross-sectional shape of the gunwale assembly, and having a portion pressing downwardly on an upper surface of the gunwale assembly and an oppositely disposed portion pressing upwardly against an oppositely disposed surface of the gunwale assembly,*

*(c) a resilient portion integrally and resiliently connecting and drawing the two portions of the body member toward each other, the three portions of the body member acing to grasp the gunwale guard to hold the fastener clip and gunwale guard together, without utilization of any impinging portion from either the boat or body member.*

*(d) said oppositely disposed, upwardly pressing portion having connected thereto, a downwardly curving and outwardly extending handle portion,*

*(e) a struck-up tongue portion in said handle portion, projecting into and at least partially obstructing the space between said upwardly pressing portion and said forwardly extending portion.*

*8. The fastener-clip construction set forth in claim 7 further characterized by:*

*(d) means for connecting the cover and fastener-clip together at a point outboardly of the line between the downwardly pressing portion of the body member and the upwardly pressing portion of the body member, to thereby tend to rotate the clip member in an upwardly and inboardly direction.*

*9. A fastener-clip assembly which is designed as an attachment for the cover of a small boat, for use when the boat is not actually being used, to provide a holding means between the cover and gunwale assembly or any other part of the boat, and will on itself have no projecting means to mar the surface of the gunwale assembly and bearing surfaces for co-acting with the gunwale assembly without marring the same, comprising:*

*(a) a fastener-clip body member of resilient material adapted to fit the gunwale assembly edge of a boat,*

*(b) the body member being formed of a flat resilient strip of material and having a smooth surface following generally the cross-sectional shape of the gunwale assembly, and having a portion pressing downwardly on an upper surface of the gunwale assembly and an oppositely disposed portion pressing upwardly against a downwardly pressing surface of the gunwale assembly,*

*(c) a resilient portion integrally and resiliently connecting and drawing the two portions of the body member toward each other, the three portions of the body member acting to grasp the gunwale assembly,*

*(d) a draw-cord and,*

*(e) the clip body member adjacent to the outboard end having a cord-holding loop integral with the clip for retaining a tightened draw-cord.*

*10. A fastener-clip construction which is designed as an attachment for the cover of a small boat, for use when the boat is not actually being used, to provide a holding means between the cover and gunwale assembly or any other part of the boat, and will on itself have no projecting means to mar the surface of the gunwale assembly and bearing surfaces, for co-acting with the gunwale assembly without marring the same, comprising:*

*(a) a fastener-clip body member of resilient material adapted to fit the gunwale assembly edge of a boat,*

*(b) the body member being formed of a flat resilient strip of material and having a smooth surface following generally the cross-sectional shape of the gunwale assembly, and having a portion pressing downwardly on an upper surface of the gunwale assembly and an oppositely disposed portion pressing upwardly against a downwardly pressing surface of the gunwale assembly,*

*(c) a loop portion on said clip connected to said upwardly pressing portion adapted to receive a draw-cord, and*

*(d) a handle portion on the clip for overcoming the resiliency of the clip to release the clip from the gunwale assembly and to open the cord loop.*

*11. A fastener-clip construction which is designed as an attachment for the cover of a small boat, for use when the boat is not actually being used, to provide a holding means between the cover and gunwale assembly or any other part of the boat, and will on itself have no projecting means to mar the surface of the gunwale assembly and bearing surfaces, for co-acting with the gunwale assembly without marring the same, comprising:*

*(a) a fastener-clip body member of resilient material adapted to fit the gunwale assembly edge of a boat,*

*(b) the body member being formed of a flat resilient strip of material and having a smooth surface following generally the cross-sectional shape of the gunwale assembly, and having a portion pressing downwardly on an upper surface of the gunwale assembly and an oppositely disposed portion pressing upwardly against a downwardly pressing surface of the gunwale assembly,*

*(c) a loop integral with said oppositely disposed, upwardly pressing portion, and*

*(d) a handle portion, integral with said loop for overcoming the resiliency of the clip, to release the clip from the gunwale assembly.*

*12. A fastener-clip construction, which is designed as an attachment means for the cover of a small boat, for use when the boat is not actually being used, to provide a holding means between the cover and gunwale assembly or edge of the boat, and presenting toward the boat a generally smooth surface, free of projections which could mar the boat surface, said fastener-clip comprising:*

*(a) a fastener-clip body member of resilient material of a shape adapted to fit the gunwale assembly edge of a boat,*

*(b) the body member being formed of a flat, resilient strip of material having a smooth surface following generally a cross-sectional shape of the upper and outboard surfaces of the gunwale assembly, with an upper gripping portion adapted to press downwardly on an upper surface of the gunwale assembly, and an integral downwardly extending portion with an inturned portion to extend below the gunwale assembly,*

*(c) a pivot member attached to said inturned portion and,*

*(d) a locking member pivotally mounted intermediate its ends on said pivot member, one end of said locking member having a cam portion adapted to engage the underside of the gunwale, the opposite end of said locking member having a loop portion adapted to receive a draw-cord, and a handle portion for actuating the locking member.*

*13. A flexible cover and fastener-clip construction,*

*which is designed to effectively cover the opening of a boat when the boat is not actually being used, and to provide a holding means between the cover and the gunwale guard of the boat, thereby to provide a measure of protection for the interior finish of the boat, and for items of equipment which may be kept therein, while presenting toward the finish of the boat a generally smooth surface, said construction comprising in combination:*

(*a*) *a flexible cover member of a size and shape to protect the desired area of the boat,*

(*b*) *a plurality of fastener-clips, each comprising a resilient body member of a shape to fit the gunwale guard of the boat,*

(*c*) *the fastener-clip body member being formed of a flat, resilient strip of material and having a smooth surface following generally the cross-sectional shape of the gunwale guard, and having a portion pressing downwardly on an upper surface of the gunwale and an oppositely disposed portion pressing upwardly against the underside of the gunwale guard,*

(*d*) *a loop integral with said oppositely disposed, upwardly pressing portion,*

(*e*) *a handle portion, integral with said loop for overcoming the resiliency of the clip, to release the clip from the gunwale assembly, and*

(*f*) *means for connecting the cover and the fastener-clip together at a point outboardly of the line between the downwardly pressing portion of the clip and the upwardly pressing portion of the clip, to thereby tend to rotate the clip member in an upwardly and inboardly direction.*

*14. The fastener-clip construction set forth in claim 11, further characterized by:*

(*e*) *means for connecting the cover and fastener-clip together at a point outwardly of the line between the downwardly pressing portion of the body member and the upwardly pressing portion of the body member, to thereby tend to rotate the clip member in an upwardly and inboardly direction.*

References Cited

The following references, cited by the Examiner, are of record in the patented file of this patent or the original patent.

UNITED STATES PATENTS

| | | | |
|---|---|---|---|
| 740,734 | 10/1903 | Bishop | 24—248 X |
| 1,533,731 | 4/1925 | Foley | 160—328 X |
| 2,764,765 | 10/1965 | Woodruff | 9—1 |
| 2,823,746 | 2/1958 | Morgan | 160—368 |
| 2,937,652 | 5/1960 | Zimmer et al. | 9—1 X |

FERGUS S. MIDDLETON, *Primary Examiner.*

MILTON BUCHLER, *Examiner.*

T. M. BLIX, *Assistant Examiner.*